SCISSORS-TYPE LINKAGE
Original Filed July 21, 1971 3 Sheets-Sheet 1
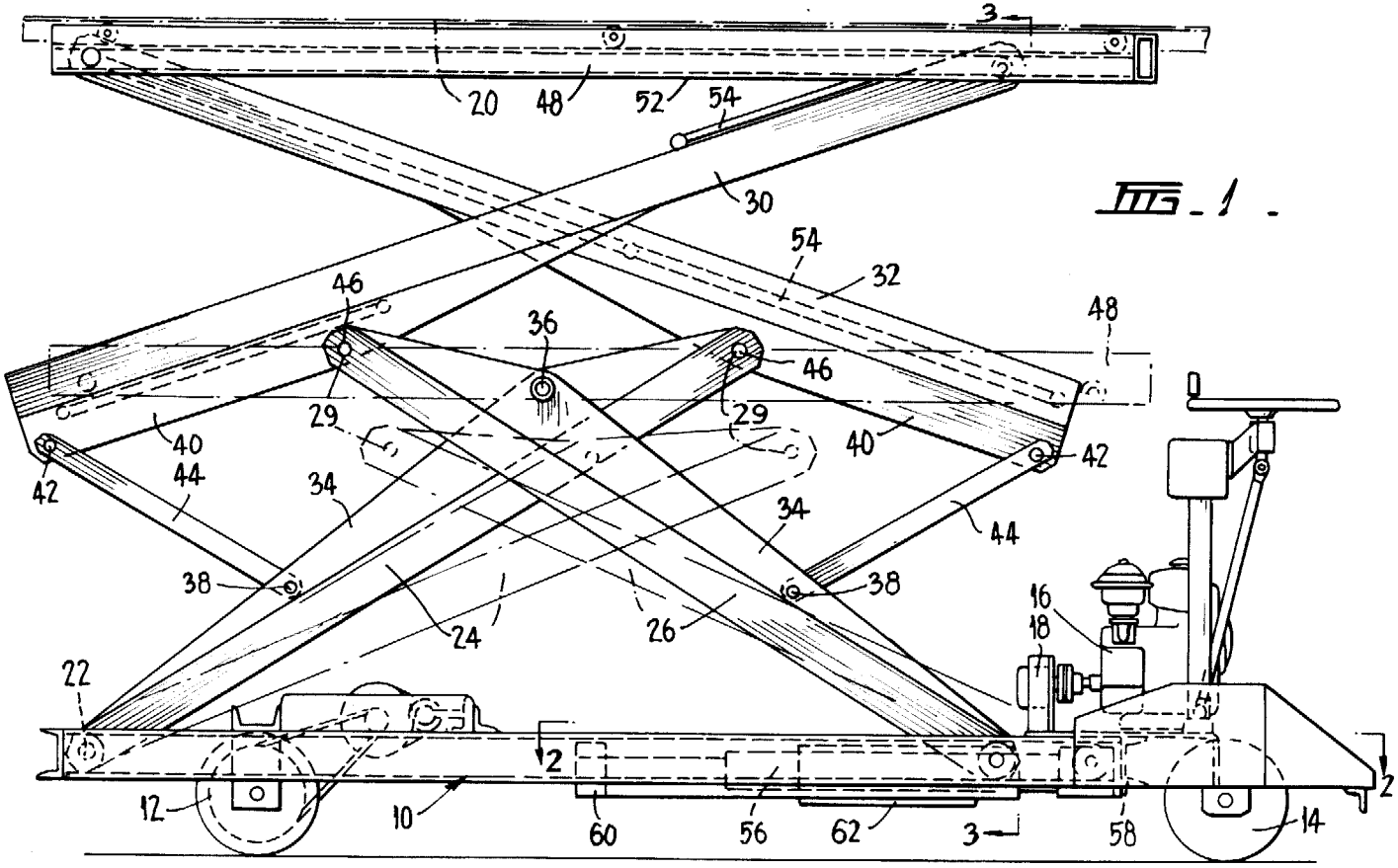

SCISSORS-TYPE LINKAGE

Original Filed July 21, 1971 3 Sheets-Sheet 2

SCISSORS-TYPE LINKAGE

Original Filed July 21, 1971 3 Sheets-Sheet 3

United States Patent Office

Re. 27,914
Reissued Feb. 5, 1974

27,914
SCISSORS-TYPE LINKAGE

John Calaby King, North Balwyn, Victoria, Australia, assignor to Concrete Formwork Engineers Pty., Ltd., Northcote, Victoria, Australia Original No. 3,700,070, dated Oct. 24, 1972, Ser. No. 164,756, July 21, 1971. Application for reissue Nov. 21, 1972, Ser. No. 308,336
Claims priority, application Australia, July 21, 1970, 1,921/70
Int. Cl. E04g *1/22*
U.S. Cl. 182—16 7 Claims

Matter enclosed in heavy brackets [ ] appears in the original patent but forms no part of this reissue specification; matter printed in italics indicates the additions made by reissue.

ABSTRACT OF THE DISCLOSURE

The invention relates to a scissors-type linkage mechanism for raising and lowering working platforms. The invention overcomes the prior art disadvantage of high initial raising force by providing a mechanism in which, in the fully collapsed position, the pivot point between the two lowest links is substantially above the line of action of a horizontally acting hydraulic cylinder.

This invention relates to an improved scissors-type or lazy tongs-type linkage and more particularly to a linkage which overcomes certain disadvantages of the standard form of scissors linkage. The type of mechanism under consideration is that used in the lazy tongs principles particularly, but not exclusively, as applied to the provision of mountings for platforms of adjustable height.

Examples of such platforms are the extendable platforms used on vehicles to enable a workman to be raised to a position in which he can work on overhead equipment, and platforms which are used for the removal of the concrete formwork used in the construction of reinforced concrete floors in buildings.

A major disadvantage of the scissors-type linkwork used in such constructions at present is that the force to be applied varies considerably between the point of initial movement and the point of full extension. If the linkwork is allowed to collapse completely in its position of rest, then the theoretical force required to cause it to commence to extend approaches infinity. The initial force can be reduced by leaving the linkwork partly extended in its collapsed condition, but this has the disadvantage that the apparatus takes up more room than would otherwise be necessary and may result in its being too high for the available headroom when used for removal of concrete formwork in buildings.

The major object of the present invention is to improve the scissors or lazy tongs-type linkage in such manner that the mechanical advantage in the collapsed condition is increased and hence the force required for initial movement is reduced.

In the usual mechanism of this type there is provided a first pair of links pivotally connected at or about their mid-points, the lower end of one link being connected to a fixed pivot and the lower end of the other link being slideable in a guideway and pivotally connected to the outer end of the piston rod of a horizontally acting hydraulic cylinder. The upper ends of the first pair of links are pivotally connected to the lower ends of a second pair of links which are piovtally connected to each other at or about their mid-points.

The upper end of one of the second pair of links is pivotally connected to a fixed point on a platform while the upper end of the other of the second pair of links is slideable in a guideway in a platform. Extension and retraction of the linkage is controlled by controlling the supply of hydraulic fluid to the horizontally acting cylinder.

According to the present invention there is provided a scissors-type linkwork comprising a first pair of links, one end of one of said links being pivotally connected to a fixed point, the corresponding end of the other of said links being constrained to slide towards and away from said fixed point, a pivotal connection between said links at a point more than half the length of said links from said first mentioned ends, a second pair of links pivotally connected to the other ends of said first pair of links at points remote from the ends of said second pair of links, a pair of tension links each of which is connected between the end of one of said second pair of links and a point on one of said first pair of said links between the pivotal connection of the first pair of links to each other and the first mentioned ends of said first pair of said links, the other end of one of said second pair of links being pivotally connected to a fixed point on an object to be moved by said linkwork and the other end of the other of said second pair of links being slideable towards and away from said last mentioned pivotal connection in a guideway in said object.

In a preferred form of the invention the pivotal connection between said first pair of links is offset from the line joining the pivotal connections at the ends of said links.

In order that the invention may be more readily understood it will now be described by way of example with reference to a particular embodiment illustrated in the accompanying drawings wherein:

FIG. 1 is a side view of a stripping trolley of the type used to remove formwork from beneath a cast concrete floor of a building and to move it outwardly of the building so that it can be picked up by a crane and lowered to ground level. The trolley incorporates the linkage of the present invention.

Figure 3:
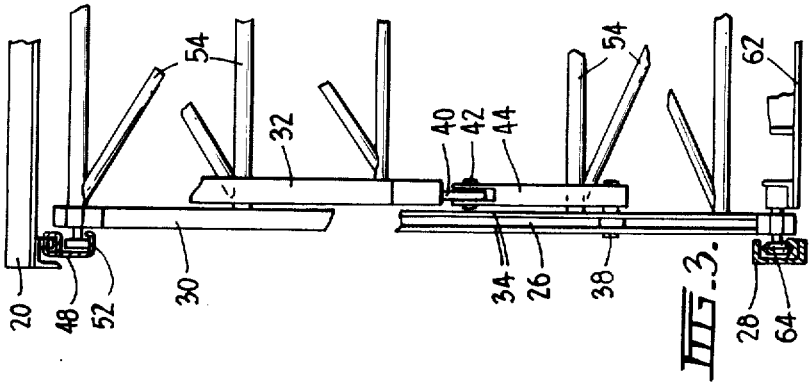
FIG. 3 is a partial sectional elevation of the trolley on line 3—3 of FIG. 1.
Figure 2:
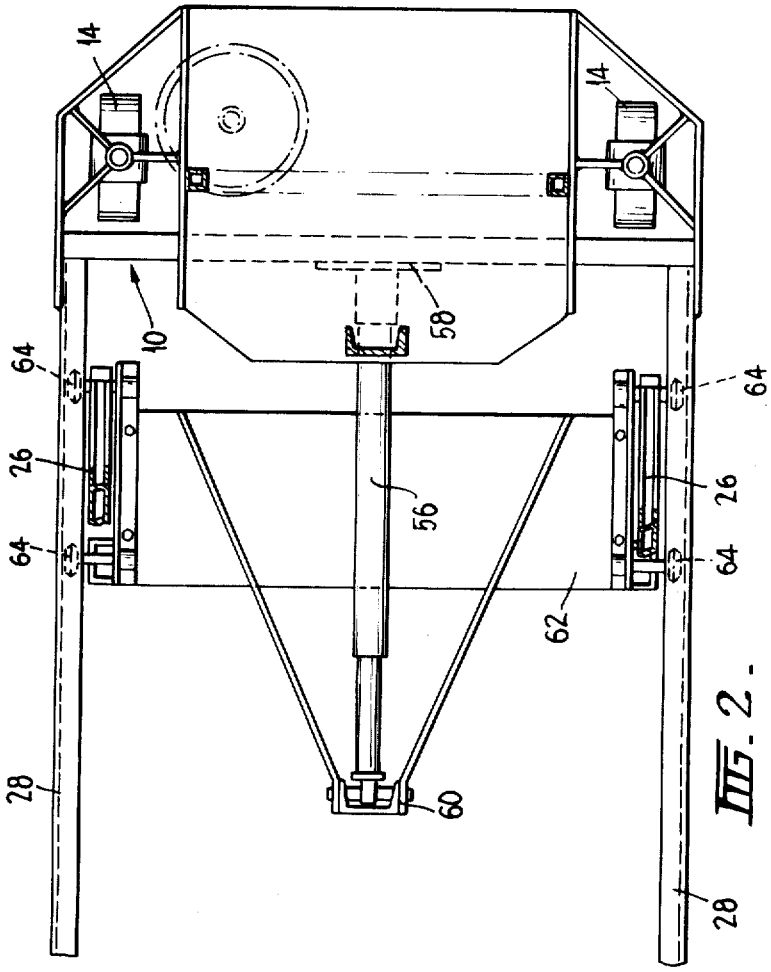
FIG. 2 is a partial plan view of the trolley of FIG. 1 taken on line 2—2 of FIG. 1.

The trolley has a base frame 10 mounted on two pairs of wheels 12, 14 of which pair 12 is driven and the other pair 14 is steerable. The whole apparatus is driven by petrol or other motor 16 mounted on the trolley and driving a hydraulic pump 18 to supply hydraulic fluid under pressure for driving the driven wheels and for raising and lowering a platform 20 mounted on the trolley.

The frame 10 is provided with a fixed pivot 22 for the lower end of one link 24 of the first pair of links 24, 26 and a horizontal guideway 28 in which the lower end of link 26 may slide. The upper end of each of the links 24, 26 is provided with a pivot point 29 for connection to a second pair of links 30, 32 in a manner to be hereinafter described.

Each of the links 24, 26 is made from a metal box-section and is provided on its upper face with a projecting web 34 in which two further pivot points 36, 38 are provided. The upper pivot point 36 in each web is located between the mid-point of the link and the upper end of the link, and the two links are pivoted to each other by means of these pivot points 36.

The lower pivot point 38 in each web is preferably between the mid-point and the lower end of each of the links 24, 26 and is for a purpose which will be hereinafter described.

The linkage has a second pair of links 30, 32 each made from a metal box-section and having a web 40 projecting downwardly from its lower face at least in the lower half of the link. The lower end of each of the second pair of links 30, 32 has a pivot point 42 by means of which it is connected, through a tension link 44, to the lower pivot point 38 on the web 34 of the adjacent link of the first pair of links 24, 26.

The web 40 on each of the second pair of links is provided with a second pivot point 46 which may, in one example, be spaced from the first mentioned pivot point by a distance equal to approximately one-third of the length of the links 30, 32 of the second pair. By means of the second pivot point 46 each link of the second pair is pivotally connected to the upper end of a link 24 or 26 of the first pair.

The links 30, 32 of the second pair are crossed but are not connected to each other. The upper end of one link 32 of the second pair is pivotally connected to a fixed point on a frame 48 adapted to support a sliding or rolling platform 20, while the upper end of the other link 30 of the second pair is constrained to move towards and away from the upper end of the first mentioned link of the second pair by means of a guideway 52 in the framework 48.

For the sake of simplicity, the construction has been described as having two pairs of links but in the practical case these pairs of links are duplicated on opposite sides of the trolley and an inter-connecting framework 54 is provided to ensure that both sets of links move simultaneously.

In the lower part of the frame there is installed a horizontally acting hydraulic cylinder 56 arranged to operate on the lower end of the sliding link 26 of the first pair. Preferably this is a two stage cylinder having a greater available force in the first stage than in the second stage.

This is best seen in FIG. 3 which shows the hydraulic cylinder 56 with one end connected at 58 to a fixed point on the frame 10 of the machine and its other end acting against an extension 60 of a carriage 62 running on rollers 64 in guideway 28. The lower ends of links 26 are pivotally connected to carriage 62.

Figure 4:
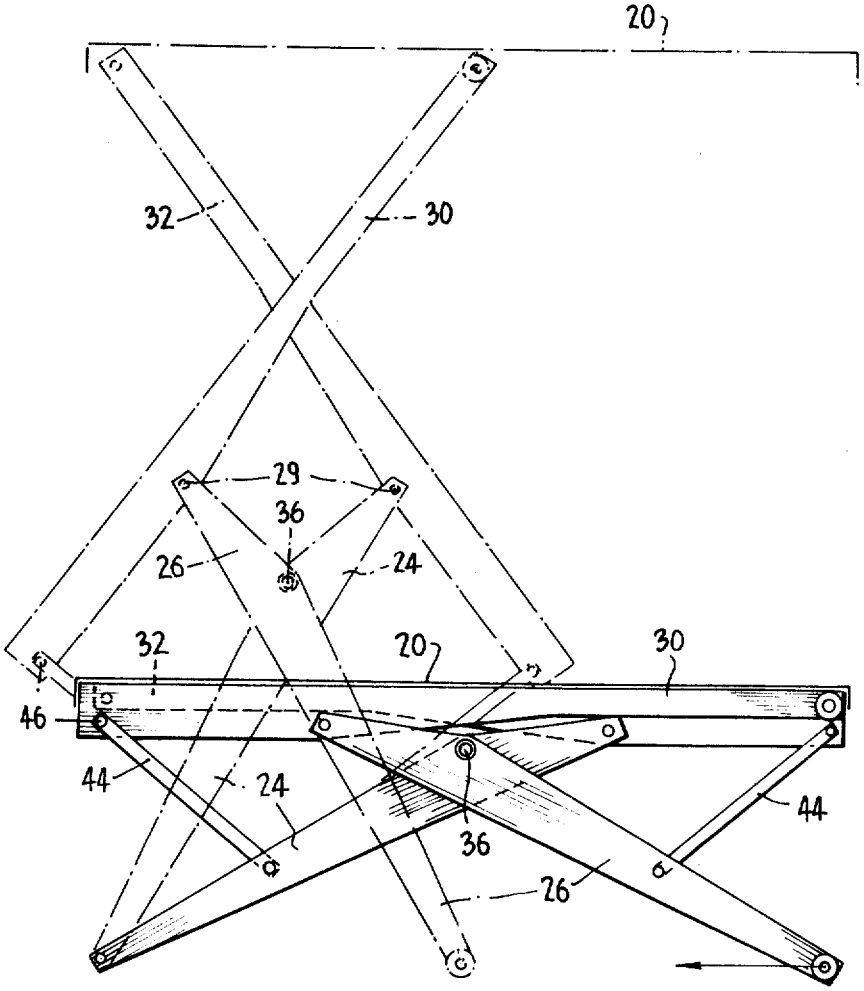
FIG. 4 is a diagrammatic view similar to FIG. 1 and showing the linkage in its fully extended position.

FIG. 4 shows the platform 20, in dotted lines, in its fully retracted position and, in full lines, the linkage in its fully extended condition with the platform at its maximum height.

FIG. 1 shows the linkage in the condition in which the platform has been raised a short distance from its fully retracted position.

The arrangement described enables the platform to be moved from its position of rest and raised with the operation of a lower force than required in the standard scissors mechanism without any increase in the height of the mechanism in its fully collapsed condition.

The reasons for this are as follows:

In a standard scissors-linkage, the links of one pair are at all times parallel to the links of another pair. With the construction described hereinabove, that condition does not apply and it is therefore possible to have the pivot point 36 between the links of the lower pair spaced a greater distance from the line of action of the hydraulic cylinder in the collapsed condition. With the standard scissors-linkage, the distance between the first pivot point and the line of action of the hydraulic cylinder would be very small. The line of action of the cylinder in the present invention is indicated at X in FIG. 4, and it will be observed that there is a substantial vertical distance between this line and pivot point 36. This gives the cylinder a large moment arm for its applied force and automatically results in a reduction of the force required to effect initial movement.

The avoidance of a pivotal connection between the links 30, 32 of the second pair and the pivoting of the second pair of links at points between their ends to the upper ends of the links 24, 26 of the first pair contributes to this effect.

The provision of the webs on the links of the first and second pair results in the pivotal connections located between the ends of the pairs of links being offset from the lines joining the pivotal connections at the ends of the pairs of links. With this arrangement, in the collapsed condition, the lines joining the pivotal connection of the first pair of links to the pivotal connection at the upper ends of the first pair of links can be horizontal, and this in turn results in the links of the second pair being horizontal in the collapsed condition as can be seen in FIG. 4.

It is thus possible to achieve a greater distance between the pivotal connection of the first pair of links and the line of action of the hydraulic cylinder without any increase in the overall height of the mechanism in the collapsed condition. In a particular example of the invention with a load of 1 ton (2,240 lbs) on the platform, initial movement can be effected with a ram force of 9,500 lbs, reducing to 7,300 lbs when the load has been raised 10 percent of the distance, 6,200 lbs when the load has been raised 25 percent of the distance, 3,100 lbs when the load has been raised 50 percent of the distance, and 1,660 lbs with the load fully raised.

If so desired there may be incorporated one or more pressure relief valves operated by movement of the piston rod of the hydraulic cylinder to limit the pressure applied to the cylinder as the load is raised. This, in conjunction with the lower force available in the second stage of the ram, enables the platform to be raised at a velocity which is more nearly constant than would be the case if a constant pressure were applied.

The claims defining the invention are as follows:

1. A scissors-type linkwork comprising a first pair of links, one end of one of said links being pivotally connected to a fixed point, the corresponding end of the other of said links being constrained to slide towards and away from said fixed point, a pivotal connection between said links at a point more than half the length of said links from said first mentioned ends, a second pair of links pivotally connected to the other ends of said first pair of links at points remote from the ends of said second pair of links, a pair of tension links each of which is connected between the end of one of said second pair of links and a point on one of said first pair of said links between the pivotal connection of the first pair of links to each other and the first mentioned ends of said first pair of said links, the other end of one of said second pair of links being pivotally connected to a fixed point on an object to be moved by said linkwork and the other end of the other of said second pair of links being slideable towards and away from said last mentioned pivotal connection in a guideway in said object.

2. A scissors-type linkwork as claimed in claim 1 wherein the pivotal connection between said first pair of links is offset from the line joining the pivotal connections at the ends of said links in a direction away from the line along which the end of the second link of said first pair of links is constrained to slide.

3. An extendable working platform comprising a base frame, two sets of scissors-type linkwork as claimed in claim 1 mounted one on each side of said framework, an upper frame supported from the outer ends of the links of the second pairs of links, and guideways in said upper frame to constrain the outer end of one of the links of each of the second pairs of links to move towards and away from the outer end of the other link of each of said second pairs of links.

4. An extendable platform as claimed in claim 3 including an extendable pressure cylinder connected to the slideable ends of the second mentioned links of the first pairs of links to cause said ends to move towards the said fixed points to raise said upper frame and away from said fixed points to lower the upper frame.

5. An extendable platform as claimed in claim 3 wherein said base frame is mounted on two pairs of wheels, at least one of which is steerable.

6. An extendable platform as claimed in claim 3 including a plurality of bracing members extending between the two sets of linkwork.

7. An extendable working platform as claimed in claim 3 including a horizontally moveable platform mounted on said upper frame.

References Cited

The following references, cited by the Examiner, are of record in the patented file of this patent or the original patent.

UNITED STATES PATENTS

| | | | |
|---|---|---|---|
| 2,402,579 | 6/1946 | Ross | 182—63 |
| 2,412,158 | 12/1946 | Kuehlman | 108—145 |
| 2,772,721 | 12/1956 | Saunders | 248—421 |
| 2,935,218 | 5/1960 | Fritz | 182—63 |
| 3,356,181 | 12/1967 | Granger | 182—63 |
| 3,447,635 | 6/1969 | Carlbom | 182—141 |
| 3,596,735 | 8/1971 | Denier | 182—63 |

REINALDO P. MACHADO, Primary Examiner

U.S. Cl. X.R.

182—63, 141; 214—512; 254—122; 187—18; 52—109; 108—145